United States Patent
Muijzert (10) Patent No.: US 10,094,944 B2
(45) Date of Patent: Oct. 9, 2018

(54) SEPARATING SURVEY DATA FOR A PLURALITY OF SURVEY SOURCES

(71) Applicant: WESTERNGECO L.L.C., Houston, TX (US)

(72) Inventor: Everhard Johan Muijzert, Girton (GB)

(73) Assignee: WESTERNGECO L.L.C., Houston, TX (US)

( * ) Notice: Subject to any disclaimer, the term of this patent is extended or adjusted under 35 U.S.C. 154(b) by 369 days.

(21) Appl. No.: 14/478,414

(22) Filed: Sep. 5, 2014

(65) Prior Publication Data
US 2016/0070011 A1    Mar. 10, 2016

(51) Int. Cl.
*G01V 1/00*    (2006.01)
*G01V 1/36*    (2006.01)

(52) U.S. Cl.
CPC ............... *G01V 1/36* (2013.01); *G01V 1/003* (2013.01); *G01V 2210/127* (2013.01)

(58) Field of Classification Search
CPC ..... G01V 1/003; G01V 1/36; G01V 2210/127
See application file for complete search history.

(56) References Cited

U.S. PATENT DOCUMENTS

| 2005/0038606 | A1* | 2/2005 | Gilmer | G01V 1/053 702/14 |
| 2010/0195439 | A1 | 8/2010 | Muyzert et al. | |
| 2011/0141848 | A1 | 6/2011 | Beasley et al. | |
| 2012/0039149 | A1 | 2/2012 | van Borselen et al. | |
| 2012/0250460 | A1 | 10/2012 | Edme et al. | |
| 2013/0088939 | A1* | 4/2013 | Edme | G01V 1/284 367/43 |
| 2013/0121109 | A1 | 5/2013 | Baardman et al. | |
| 2013/0135965 | A1 | 5/2013 | Ji et al. | |
| 2014/0211590 | A1 | 7/2014 | Sallas | |
| 2014/0219055 | A1 | 8/2014 | Goujon et al. | |
| 2016/0109596 | A1* | 4/2016 | Murray | G01V 1/36 367/24 |

FOREIGN PATENT DOCUMENTS

WO    2010123639    10/2010
WO    2013150452    10/2013

OTHER PUBLICATIONS

Bagaini et al., "The acquisition and processing of dithered slip-sweep vibroseis data," Geophysical Prospecting, 2012, vol. 60: pp. 618-639.

(Continued)

*Primary Examiner* — Krystine E Breier (57) ABSTRACT

Separating survey data for multiple survey sources where first survey data along a first axis measured by a survey sensor device is received, the first survey data responsive to activations of the plurality of survey sources at respective azimuths with respect to the survey sensor device. Second survey data is rotated towards a first azimuth of a first of the plurality of survey sources. The rotated second survey data is used as a model of interference caused by a subset of the plurality of survey sources excluding the first survey source. In other examples, a time dithering technique is performed to separate survey data for multiple survey sources.

13 Claims, 5 Drawing Sheets

(56) References Cited

OTHER PUBLICATIONS

Huo et al., "Unconstrained simultaneous source land data processing," Geophysical Prospecting, 2012, vol. 60: pp. 608-617.
Moore et al., "Simultaneous source separation using dithered sources," SEG Las Vegas Annual Meeting, 2008: pp. 2806-2810.
International Search Report and Written Opinion for corresponding PCT Application Serial No. PCT/US2015/046936, dated Nov. 6 2015, 11 pages.

* cited by examiner

SEPARATING SURVEY DATA FOR A PLURALITY OF SURVEY SOURCES

BACKGROUND

Seismic surveying is used for identifying subterranean features of interest, such as hydrocarbon reservoirs, freshwater aquifers, gas injection zones, and so forth. In seismic surveying, seismic sources are activated to generate seismic waves directed into a subsurface structure.

The seismic waves generated by a seismic source travel into the subsurface structure, with a portion of the seismic waves reflected back to the surface for receipt by seismic sensors (e.g., geophones, accelerometers, etc.). These seismic sensors produce signals that represent detected seismic waves. Signals from the seismic sensors are processed to yield information about the content and characteristics of the subterranean structure.

A land-based seismic survey arrangement can include a deployment of an array of seismic sensors on the ground. A marine survey arrangement can include placing a seabed cable or other arrangement of seismic sensors on the seafloor or other water bottom surface.

SUMMARY

In general, according to some implementations, separating survey data for a plurality of survey sources includes receiving first survey data along a first axis measured by a survey sensor device, the first survey data responsive to activations of the plurality of survey sources at respective azimuths with respect to the survey sensor device. Second survey data is rotated towards a first azimuth of a first of the plurality of survey sources. The rotated second survey data is used as a model of interference caused by a subset of the plurality of survey sources excluding the first survey source.

Other of additional features will become apparent from the following description, from the drawings, and from the claims.

BRIEF DESCRIPTION OF THE DRAWINGS

Some implementations are described with respect to the following figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the scope of the invention as set forth in the appended claims.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

A survey arrangement to survey a target structure, such as a subsurface structure, can include an arrangement of survey receivers and survey sources. In seismic surveying, the survey receivers are seismic sensors that are used to measure seismic data, such as displacement, velocity, or acceleration. Seismic sensors can include geophones, accelerometers, microelectromechanical systems (MEMS) sensors (e.g., MEMS accelerometers), or any other types of sensors that measure translational motion of a surface in one or more directions. A MEMS sensor includes elements with sizes in the nanometers or micrometers range. One or more of the elements of the MEMS sensor may be moveable.

In the ensuing discussion, a seismic sensor that measures translational motion is referred to as a particle motion sensor. The particle motion sensor can refer to any of the sensors listed above. A particle motion sensor can measure translational data along at least a given direction. In some examples, a particle motion sensor can include multiple sensing elements that measure translational data in multiple different directions. Although reference is made to particle motion sensors in the present disclosure, it is noted that other types of survey sensors can be employed in other implementations.

An arrangement of particle motion sensors can be provided at (or proximate) an earth surface (land surface or bottom surface of a body of water, such as a seafloor) to measure seismic waves reflected from a subsurface structure, in response to seismic waves (or impulses) produced by one or more seismic sources and propagated into an earth subsurface. A seismic source can include an air gun, a vibrator, an explosive, or any other source that is able to produce acoustic energy.

A particle motion sensor provided at a ground surface can refer to a particle motion sensor that is placed in contact with the ground surface, partially buried in the ground surface, or completely buried in the ground surface up to a predetermined depth (e.g., up to a depth of less than 5 meters). A particle motion sensor at (or proximate) the earth surface can record the vectorial part of an elastic wavefield just below the free surface (i.e., earth surface).

In some examples, seismic surveying arrangements, a delay time between the activation of a seismic source and a next activation of a seismic source is such that the energy from the previously activated seismic source has decayed to an acceptable level before the next seismic source is activated. Waiting this delay time between successive activations of seismic sources can reduce the data acquisition rate (the rate at which measured seismic data can be acquired in response to activations of seismic sources).

To increase the data acquisition rate, a survey acquisition operation can employ simultaneous seismic sources. Use of "simultaneous seismic sources" can refer to a survey acquisition technique or arrangement in which seismic sources are activated relatively closely in time with respect to each other, such that the energy from the activation of one seismic source can interfere with survey data acquired in response to an activation of a subsequently activated seismic source. Stated differently, use of "simultaneous seismic sources" can refer to a survey acquisition technique or arrangement in which a measured data record can include contributions from multiple seismic sources, which are activated within a time interval where activation of a first seismic source can interfere with seismic data acquired due to activation of at least one other seismic source.

In accordance with some implementations, processing can be applied to separate survey data for the simultaneous seismic sources. Separating survey data for the simultaneous seismic sources (a process referred to as "simultaneous source separation") can refer to determining the survey data due to the contribution of each individual seismic source, with reduced or no contribution from activation(s) of other seismic source(s). In this manner, the interference among seismic sources that are activated closely in time can be removed or mitigated.

In some implementations, simultaneous source separation can be performed based on measured data responsive to seismic sources that are located at different azimuths with respect to a sensor device. The measured data, such as gradient data or horizontal data, can be rotated towards the azimuths of the sources, and the rotated data can be used as a model of interference caused by a subset of the seismic sources. The terms "gradient data" and "horizontal data" are discussed further below.

In other implementations, a time dithering technique can be applied to perform simultaneous source separation. Examples of time dithering techniques are discussed further below.

Figure 1:
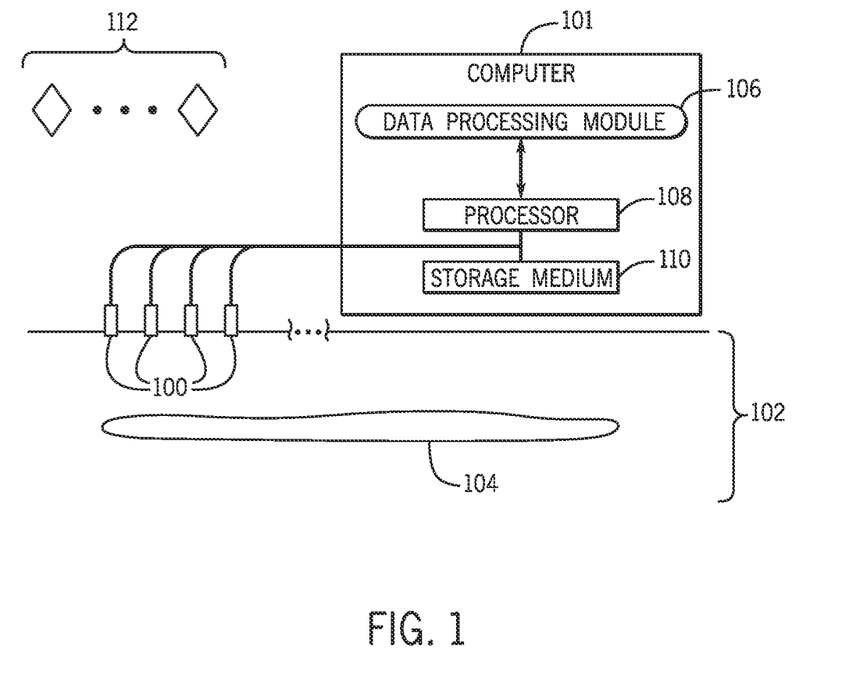
FIG. 1 is a schematic diagram of an example survey arrangement including sensor devices according to some implementations.

FIG. 1 is a schematic diagram of a land-based survey arrangement that includes survey sensor devices 100 according to some implementations. The sensor devices 100 can include gradient sensor devices, discussed further below. In different examples, the sensor devices 100 can be deployed in a marine survey arrangement.

Measurements acquired by the sensor devices 100 are transmitted to a computer 101, where the measurements are recorded (stored in a storage medium or storage media 110). The measurements are made by the sensor devices 100 in response to seismic waves produced by seismic sources 112, which can be activated close in time to each other. The seismic waves are propagated into a subsurface structure 102, and reflected from a subsurface element 104 of interest. The reflected waves are detected by the sensor devices 100.

In the present disclosure, reference is made to performing surveying to characterize a subsurface structure. In other examples, techniques or mechanisms according to some implementations can also be applied to perform surveys of other target structures, such as human tissue, a mechanical structure, plant tissue, animal tissue, a solid volume, a substantially solid volume, a liquid volume, a gas volume, a plasma volume, a volume of space near and/or outside the atmosphere of a planet, asteroid, comet, moon, or other body, and so forth.

The computer 101 includes a data processing module 106, which can be implemented with machine-readable instructions that are executable on one or more processors 108 coupled to the storage medium (or storage media) 110. The data processing module 106 can perform simultaneous source separation according to some implementations.

Figure 2:
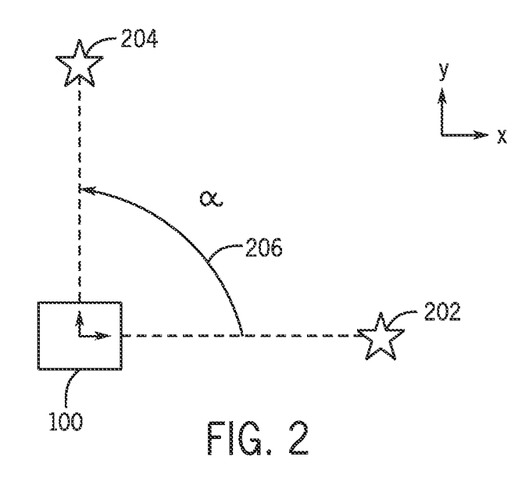
FIGS. 2 and 3 are schematic diagrams of example arrangements of survey sources and a survey sensor device according to various implementations.

FIG. 2 is an example of a survey arrangement that includes multiple seismic sources 202 and 204 and a sensor device 100. The seismic sources 202 and 204 can be "simultaneously activated;" in other words, the seismic sources are activated relatively closely in time with respect to each other, such that the energy from the activation of one seismic source can interfere with survey data acquired in response to an activation of at least another seismic source.

The seismic sources 202 and 204 are located at respective different azimuths with respect to the sensor device 100. In the example of FIG. 2, the seismic source 202 is separated from the sensor device 100 along an x axis, and the seismic source 204 is separated from the sensor device 100 along a y axis. Stated differently, the seismic source 202 and the sensor device 100 are aligned or lined up along the x axis, and the seismic source 204 and the sensor device 100 are aligned or lined up along the y axis.

In the example of FIG. 2, a first direction along which the seismic source 202 and the sensor device 100 are lined up is about 90° with respect to a second direction along which the seismic source 204 and the sensor device 100 are lined up.

Figure 3:
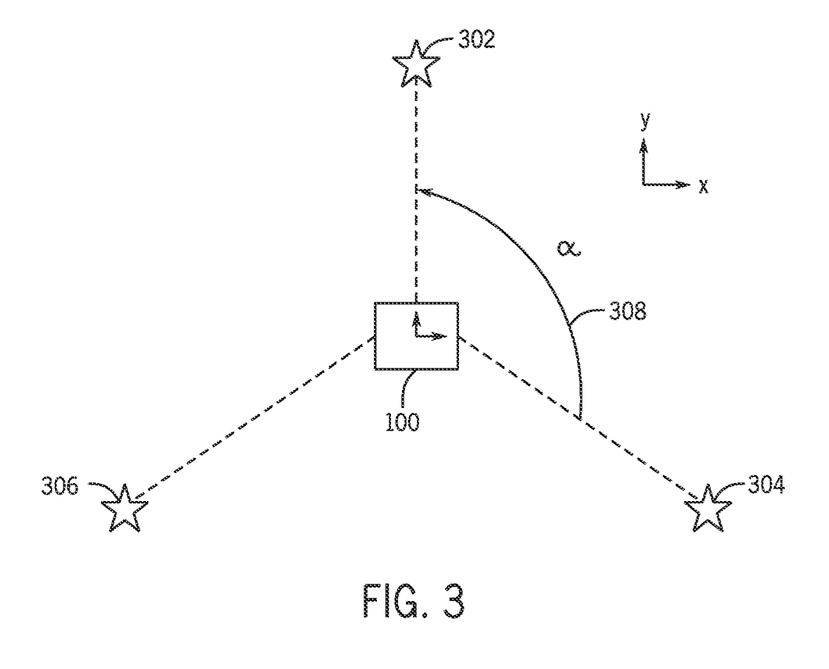

FIG. 3 depicts another example arrangement in which three seismic sources 302, 304, and 306 are located at different azimuths with respect to the sensor device 100. In the example of FIG. 3, a direction along which each seismic source and the sensor device 100 is lined up is about 120° offset with respect to a direction along which another seismic source and the sensor device 100 are lined up.

Although specific numbers of examples are shown in FIGS. 2 and 3, it is noted that other arrangements can include other numbers of seismic sources positioned at different offsets and azimuths with respect to a sensor device 100.

Figure 4:
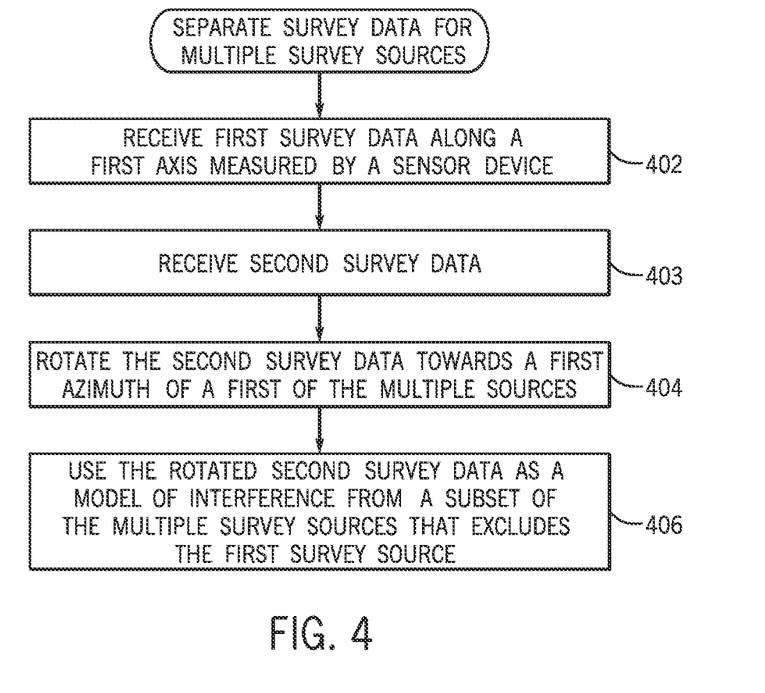
FIGS. 4 and 5 are flow diagrams of example processes of separating survey data for multiple survey sources, according to some implementations.

FIG. 4 shows an example process to separate survey data for multiple survey sources (e.g., simultaneous survey sources), which can be performed by the data processing module 106 shown in FIG. 1, for example. In some examples, the process of FIG. 4 can be applied with respect to survey data measured by the sensor device 100 in the arrangement of FIG. 2 or 3.

The process receives (at 402) first survey data along a first axis measured by the sensor device 100. The first survey data is responsive to activations of the multiple survey sources at respective azimuths with respect to the sensor device 100 (e.g., the azimuths shown in FIG. 2 or 3). Note that the first survey data can include translational data measured with respect to the first axis, which can be the z axis, or vertical axis. The z axis is generally orthogonal to the x and y axes shown in FIG. 2 or 3. Although reference is made to the z axis as being an example of the "first axis" of FIG. 4, it is noted that in other examples, the first survey data received at 402 can be along a different axis.

The process receives (at 403) second survey data. In some implementations, the second survey data can include gradient data, which can be measured by the sensor device 100, or can be computed based on measurement data from the sensor device 100. A sensor device 100 that can measure gradient data or that enables the computation of gradient data is referred to as a gradient sensor device.

"Gradient data" refers to a spatial gradient of translational data, which is a spatial derivative of the translational data with respect to a given axis. For example, a particle motion sensor can measure translational data along a vertical axis (e.g., z axis). A gradient of the vertical translational data can be calculated by taking a spatial derivative of the vertical translational data with respect to a horizontal axis (e.g., x or y axis, where the x axis is generally perpendicular to the y axis, and both the x and y axes are generally perpendicular to the z axis).

The spatial gradient of translational data ("gradient data") can be approximated by using measurements of closely spaced apart particle motion sensors in the sensor device 100. For example, particle motion sensors for measuring vertical translational data can be spaced apart by an offset that is less than a third of a wavelength of signals of interest to be measured by the particle motion sensors.

In other implementations, the second survey data that is received at 403 can include horizontal translational data (translational data along the x and/or y axes) measured by one or more particle motion sensors that is (are) part of the sensor device 100. In examples where the first survey data received at FIG. 4 is translational data along the first axis that is other than the z axis, the second survey data that is rotated at 404 can include translational data along another axis perpendicular to the first axis.

The process further rotates (at 404) the second survey data (gradient data or horizontal translational data) towards a first azimuth of a first of the multiple survey sources. As discussed further below, rotating the second survey data is performed by applying a mathematical computation to perform the rotation mathematically.

The rotation of gradient data performed at 404 in FIG. 4 can include rotation of gradient data that include a spatial gradient of the first survey data with respect to one or both of the horizontal axes (e.g., x axis and/or y axis).

The process of FIG. 4 uses (at 406) the rotated second survey data as a model of interference caused by a subset of the multiple survey sources that excludes the first survey source. Thus, in the example of FIG. 2, if the rotated second survey data is produced by rotating the second survey data towards the azimuth of the seismic source 202, then the rotated second survey data can be used as a model of interference caused by the second seismic source 204. In the example of FIG. 3, if the rotated second survey data is rotated towards the azimuth of the seismic source 302, then the rotated second survey data can be used as a model of interference caused by the seismic sources 304 and 306.

Tasks 404 and 406 can be re-iterated for each of the other seismic sources. For example, in the next iteration, the second survey data can be rotated towards a second azimuth of a second of the multiple survey sources. The rotated second survey data that is rotated towards the second azimuth can then be used as a model of interference caused by a subset of the multiple survey sources that excludes the second survey source.

In the ensuing discussion, it is assumed that translational data ("first survey data" of FIG. 4) measured by the sensor device 100 includes velocity Vz along the z axis. In other examples, other types of translational data can be measured, such as displacement and acceleration. The spatial gradient of Vz with respect to the x and y axes (an example of the "second survey data" referred to in FIG. 4) are represented by the following, respectively:

$$\frac{dVz}{dx} \text{ and } \frac{dVz}{dy}.$$

The translational data, Vz, and the gradient data, $$\frac{dVz}{dx} \text{ and } \frac{dVz}{dy},$$

can be measured by the sensor device 100. In other examples, the gradient data can be derived at the computer 101 shown in FIG. 1, based on data measured by the sensor device 100.

The rotation of gradient data, $$\frac{dVz}{dx} \text{ and } \frac{dVz}{dy},$$

to an azimuth $\alpha_i$, where i represents a specific seismic source of the multiple seismic sources, can be computed as follows:

$$\begin{bmatrix} \frac{dVz}{dx_i} \\ \frac{dVz}{dy_i} \end{bmatrix} = \begin{bmatrix} \cos\alpha_i & -\sin\alpha_i \\ \sin\alpha_i & \cos\alpha_i \end{bmatrix} \begin{bmatrix} \frac{dVz}{dx} \\ \frac{dVz}{dy} \end{bmatrix}. \quad \text{(Eq. 1)}$$

In Eq. 1, $$\frac{dVz}{dx_i}$$

represents the gradient data $$\frac{dVz}{dx}$$

rotated to the azimuth $\alpha_i$, and $$\frac{dVz}{dy_i}$$

represents the gradient data $$\frac{dVz}{dy},$$

rotated to the azimuth $\alpha_i$ (the rotation to the azimuth $\alpha_i$ is represented by arrow 206 or 308 in FIG. 2 or 3, respectively).

In some examples, $$\frac{dVz}{dy_i},$$

that represents seismic energy propagating in the direction perpendicular to the direction of azimuth $\alpha_i$, can be used as a model of interference from a subset of the seismic sources that excludes the seismic source i. To remove the contributions of the interfering seismic source(s), adaptive subtraction can be performed using an adaptive filter. An example of adaptive subtraction is provided below:

$$V_{zi} = \min\left(Vz - F \cdot \frac{dV_z}{dy_i}\right), \quad \text{(Eq. 2)}$$

where $V_{zi}$ represents the translational data for seismic source i with contributions (i.e., interference) from the other seismic source(s) removed or attenuated. Also, in Eq. 2, F represents filter coefficients for the adaptive filter. The right hand side term of Eq. 2 may be minimized using the least squares method.

Note that in Eq. 2, just the term $$\frac{dV_z}{dy_i}$$

from Eq. 1 is used as the "second survey data" discussed in connection with FIG. 4. The $$\frac{dV_z}{dy_i}$$

data is along a affection that is generally perpendicular to the direction of the azimuth $\alpha_i$. For example, in the context of FIG. 2, if $$\frac{dV_z}{dy_i}$$

is rotated towards $\alpha_i$ (the azimuth of the source 204), then $$\frac{dV_z}{dy_i}$$

is in a direction that is generally perpendicular to the direction between the survey sensor device 100 and the source 204. "Generally perpendicular" can refer to exactly perpendicular, or to substantially perpendicular (e.g., ±10° of perpendicular).

Figure 5:
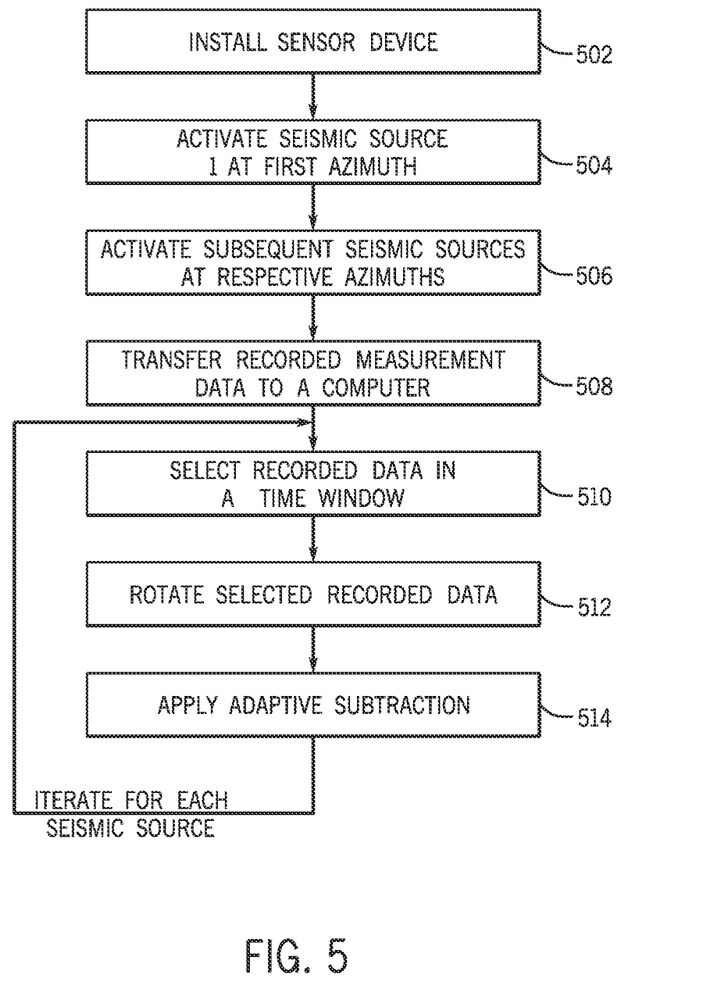

FIG. 5 is a flow diagram of an example process according to further implementations. A sensor device 100 is installed (at 502), where the sensor device is able to make measurements to provide Vz and $$\frac{dVz}{dx} \text{ and } \frac{dVz}{dy},$$

as examples. The process activates (at 504) seismic source 1, which is located at azimuth $\alpha_1$ with respect to x at time $t_1$. In response to activation of seismic source 1, data is recorded by the sensor device 100.

The process further activates (at 506) subsequent seismic sources i at respective azimuths $\alpha_i$. The activation time of seismic source i (and possibly also seismic source i+1) is within a time interval, Time_Interval=$t_{i-1}$+Record_Length, where Record_Length represents the time that it takes for the seismic energy to propagate from a source to the sensor device 100. The recorded measurement data due to activations of the multiple seismic sources 1, . . . , N, (N>1 and represents the number of seismic sources) can be transferred (at 508) to the computer 101 of FIG. 1, for example. After a source has fired it may be moved to a new location. This new location may be at a different distance and azimuth from the sensor device 100. After the N sources have fired the source firing sequence repeats which can be within Time_Interval=$t_{i-1}$+Record_Length.

Tasks 510, 512, and 514 are performed at the computer 101, and more specifically by the data processing module 106 executed in the computer 101. The computer 101 selects (at 510) recorded data in a time window starting at the activation time $t_i$ for seismic source i (starting with i=1), where the time window has a record length represented as Record_Length.

The selected recorded data is then rotated (at 512) to azimuth $\alpha_i$, by application of Eq. 1, for example. Adaptive subtraction is then applied (at 514), according to Eq. 2, discussed above, to subtract the rotated selected recorded data from measured translational data. The tasks 510, 512, and 514 are then re-iterated for each of the other seismic source(s) of the seismic survey arrangement, by incrementing i for example.

Figure 6:
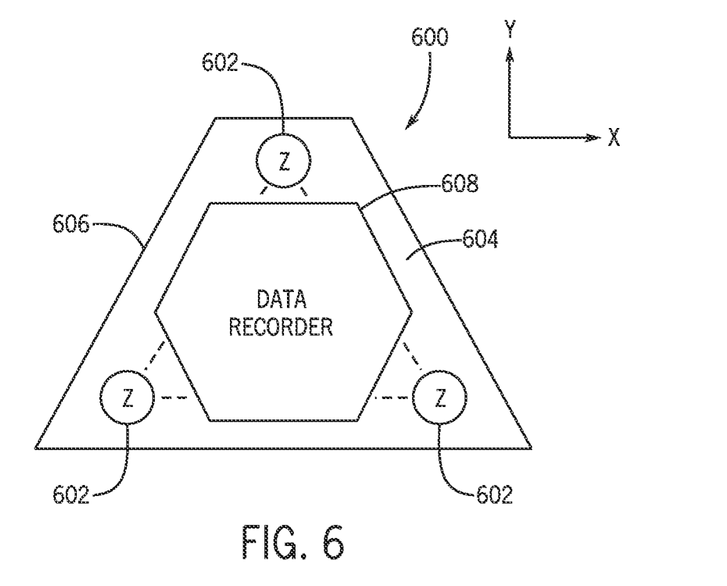
FIG. 6 is a schematic diagram of an example survey sensor device according to some implementations.

FIG. 6 is a schematic diagram of a gradient sensor device 100 that has an arrangement of three particle motion sensors 602 that measure translational data (e.g., displacement, velocity, or acceleration) along the z axis, which can be the vertical axis. In some examples, the particle motion sensors 602 are MEMS accelerometers. In other examples, the particle motion sensors 602 can include other types of sensors. Although three particle motion sensors 602 are shown in FIG. 6, it is noted that in other examples, more than three particle motion sensors can be included in the gradient sensor device 100.

The particle motion sensors 602 are arranged on a surface 604 provided by a support structure 606. The surface 604 on which the particle motion sensors 602 are arranged can be within a plane defined by the x and y axes. Placing the particle motion sensors on a common support structure (606) of a single sensor device allows for more accurate placement of the particle motion sensors, such that the effect of perturbations and noise can be reduced. Manufacturing processes can allow for the positioning of the particle motion sensors 602 to within a millimeter of a target position, and an orientation to within 1° of a target orientation.

In the example of FIG. 1, the particle motion sensors 602 are provided at respective positions on the surface 604 of the support structure 606. The positions of the particle motion sensors 602 can form corners of a triangle, to provide a triangular arrangement. In other examples, other arrangements of particle motion sensors can be employed.

To accommodate the particle motion sensors 602 in the example triangular arrangement, the support structure 606 can have a generally triangular shape. However, in other examples, the support structure 106 can have other shapes. More generally, the shape of the support structure 106 and the shape of the housing of the gradient sensor device 100 do not have to be constrained to the layout of the particle motion sensors 602.

The particle motion sensors 602 have an arrangement that enables the calculation of a spatial gradient of the translational data (in the z axis) measured by the particle motion sensors with respect to the x axis and/or y axis. In other words, a horizontal gradient can be computed of the vertical translational data. More generally, the particle motion sensors measure translational data in a first direction, and the particle motion sensors 602 have an arrangement that enables calculation of a spatial gradient of the translational data in a second direction different from the first direction, where the second direction is generally perpendicular to the first direction.

In some examples, to enable the calculation of a spatial gradient of translational data as discussed above, the spacing between each pair of particle motion sensors 602 in the gradient sensor device 100 can be less than a third of the wavelength of a signal of interest (e.g., a seismic signal to be measured by each particle motion sensor 102). In other examples, the spacing between the particle motion sensors 102 can be less than 10% of the wavelength of interest, which can allow for a reduction of the size of the gradient sensor device 100. In further examples, the spacing between particle motion sensors 602 can be less than 1% of the wavelength of interest. In some examples, the spacing between a pair of particle motion sensors 602 in the gradient in practice can be between 5 centimeters and 50 centimeters.

In some examples, the gradient sensor device 100 can include a data recorder 608 to record measurement data, which can be subsequently provided to the computer 101. In other examples, the gradient sensor device can include a communication component to communicate the measured data either wirelessly or using a cable to the computer 101.

The spatial gradient of translational data (e.g., velocity Vz along the z axis) measured by the particle motion sensors 602 can be computed as follows. For three particle motion sensors 602 positioned at the corners of a right angle triangle, the spatial gradients of Vz with respect to the x and y axes are given by:

$$\frac{dVz}{dx} = \frac{Vz(1) - Vz(2)}{d12}, \frac{dVz}{dy} = \frac{Vz(3) - 0.5*(Vz(2) + Vz(1))}{d32}$$

where d12 is the distance between the a first particle motion sensor (that measured Vz(1)) and a second particle motion sensor (that measured Vz(2)), d32 is the distance between the second particle motion sensor and a third particle motion sensor (that measured Vz(3)).

In other examples, other techniques for computing gradient data can be employed, using other types of sensor devices with other types of arrangements of particle motion sensors. Gradient data can be directly measured with rotation sensors such as the Eentec R1 sensor, for example.

In other implementations, a time dithering technique can be applied for performing simultaneous source separation. The ensuing discussion refers to an example with just two seismic sources (seismic source 1 and seismic source 2). However, the technique can also be extended to include more seismic sources. Within the time duration of a data record, two seismic sources are fired. As a result, each data record contains measured survey data responsive to activation of multiple seismic sources. In practice, source 1 can be moved to a new location while source 2 is shooting and be ready for its next shot when source 2 has finished shooting. This can result in a long data record with multiple shots fired by each source. The time between successive firings of seismic sources is not fixed (non-repetitive) and should not have a regular pattern and can have some known random variation. As a result when the measured survey data is selected based on, for example, the activation time of seismic source 1, this will result in a coherent wavefield.

However, on top of the coherent wavefield, due to activation of seismic source 1, there can be contributions from energy corresponding to seismic source 2. The energy corresponding to source 2 is not be coherent in the data record since seismic source 2 was fired with random timing variations with respect to seismic source 1. Likewise if the measured survey data is selected based on the activation time of seismic source 2, a coherent wavefield will emerge, with an added incoherent wavefield originating from seismic source 1.

The measured survey data $d_1$ from seismic source 1 and the respective gradient data can be represented in the Radon domain by a set of functions with amplitude $m_{1k}$ (where $k \geq 1$ represents the number of functions), and intercept times and slownesses:

$$d_1 = A_1 m_1, \text{ where } A_1 = \Sigma_k \exp^{i\omega x_1 p_{xk} + i\omega y_1 p_{yk}}. \tag{Eq. 3}$$

In Eq. 3, $\omega$ represents frequency, $x_1$ and $y_1$ represent coordinates along the x and y axes of seismic source 1 with respect to the receiver, and $p_{xk}$ and $p_{yk}$ represent slownesses in the x and y directions, respectively. The gradient data for seismic source 1 is given by $$\frac{\partial d_1}{\partial x} = B_1 m_1, \tag{Eq. 4}$$

$$\text{where } B_1 = \sum_k i\omega p_{xk} \exp^{i\omega x_1 p_{xk} + i\omega y_1 p_{yk}},$$

$$\frac{\partial d_1}{\partial y} = C_1 m_1, \tag{Eq. 5}$$

$$\text{where } C_1 = \sum_k i\omega p_{yk} \exp^{i\omega x_1 p_{xk} + i\omega y_1 p_{yk}}.$$

Likewise the measured survey data $d_2$ from the seismic source 2 and the respective gradient data can be represented in the Radon domain, and can be written as $$d_2 = D_{12} A_2 m_2, \quad \frac{\partial d_2}{\partial x} = D_{12} B_2 m_2, \quad \frac{\partial d_2}{\partial y} = D_{12} C_2 m_2, \tag{Eq. 6}$$

where $D_{12}$ is the known time dither between seismic sources 1 and 2:

$$D_{12} = e^{i\omega t_{12}}, \tag{Eq. 7}$$

where $t_{12}$ is the dither time between activations of successive sources.

The foregoing results in a system of linear equations, expressed in Eq. 8 below, where the left hand side contains the measured/derived translational data and gradient data:

$$\begin{bmatrix} d_1 + d_2 \\ \frac{\partial d_1}{\partial x} + \frac{\partial d_2}{\partial x} \\ \frac{\partial d_1}{\partial y} + \frac{\partial d_2}{\partial y} \end{bmatrix} = \begin{bmatrix} A_1 & D_{12} A_2 \\ B_1 & D_{12} B_2 \\ C_1 & D_{12} C_2 \end{bmatrix} \begin{bmatrix} m_1 \\ m_2 \end{bmatrix}. \tag{Eq. 8}$$

Note that $d_1 + d_2$ is the total measured translational data measured by a sensor device 100 in response to activations of both seismic sources 1 and 2, $$\frac{\partial d_1}{\partial x} + \frac{\partial d_2}{\partial x}$$

is the total gradient data along the x axis measured by the sensor device 100, and $$\frac{\partial d_1}{\partial y} + \frac{\partial d_2}{\partial y}$$

is the total gradient data along they axis measured by the sensor device 100.

The system of equations in equation 8 can be solved with any of various linear solvers to derive separated source data $m_1$ and $m_2$, where $m_1$ represents the separated survey data (translational data) for seismic source 1 with the contribution (interference) from seismic source 2 removed, and $m_2$ represents the separated survey data (translational data) for seismic source 2 with the contribution (interference) from seismic source 1 removed.

In Eq. 8, $A_1$, $B_1$, $C_1$, $D_{12} A_2$, $D_{12} B_2$, and $D_{12} C_3$ are examples of Radon operators calculated according to Eqs. 3-7 above.

Figure 7:
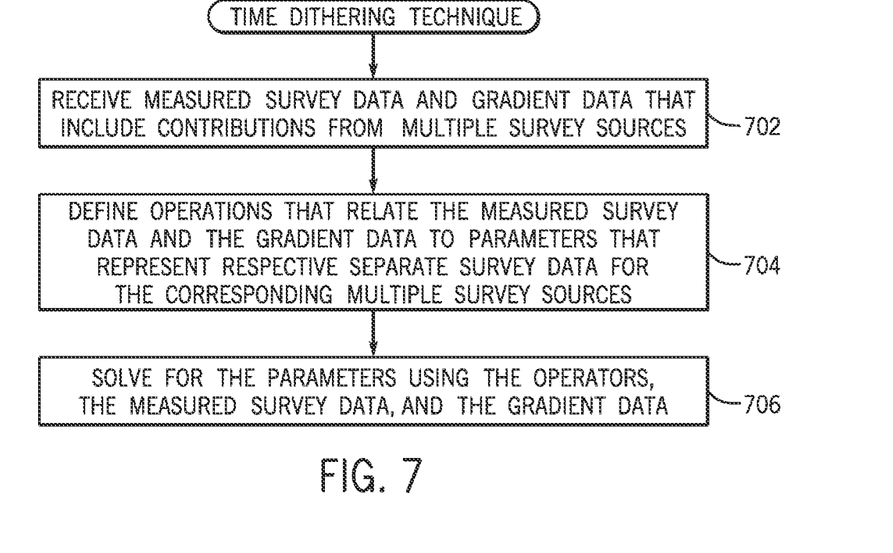
FIG. 7 is a flow diagram of an example process of separating survey data for multiple survey sources, according to further implementations.

FIG. 7 is a flow diagram of an example time dithering technique to perform simultaneous source separation. The process of FIG. 7 can be performed by the data processing module 106 of FIG. 1, for example.

The process of FIG. 7 receives (at 702) measured survey data and gradient data that include contributions from activations of multiple survey sources.

The process further defines (at 704) operators that relate the measured survey data and the gradient data to parameters (e.g., $m_1$ and $m_2$) that represent respective separate survey data for the corresponding multiple survey sources. In some examples, the operators are Radon operators $A_1$, $B_1$, $C_1$, $D_{12} A_2$, $D_{12} B_2$, and $D_{12} C_3$ as discussed above.

The process then solves (at 706) for the parameters using the operators, the measured survey data, and the gradient data, to separate the measured survey data for the multiple survey sources.

As noted above, the data processing module 106 of FIG. 1 can be implemented as machine-readable instructions loaded for execution on one or more processors (e.g., 108 in FIG. 1). A processor can include a microprocessor, microcontroller, processor module or subsystem, programmable integrated circuit, programmable gate array, or another control or computing device. A "system" as used herein can refer to a computer, multiple computers, a processor, multiple processors, or any other device (or multiple devices).

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method of separating survey data for a plurality of seismic sources, comprising:
   activating the plurality of seismic sources;
   receiving signal from the seismic sources via a seismic sensor for transmission to a system including a processor, wherein the seismic sources are located at respective different azimuths with respect to the seismic sensor;
   receiving, by the system including the processor, first survey data along a first axis measured by the seismic sensor, the first survey data generated by the activating of the plurality of seismic sources;

receiving, by the system including the processor, second survey data, wherein the second survey data comprises one or more of gradient data measured by the seismic sensor, gradient data computed based on measurement data from the seismic sensor, or horizontal translational data;

rotating, by the system including the processor, the second survey data towards a first azimuth of a first of the plurality of seismic sources; and using, by the system including the processor, the rotated second survey data as a model of interference caused by a subset of the plurality of seismic sources excluding the first seismic source, wherein the using comprises subtracting a component based on the rotated second survey data from the first survey data, to separate survey data for the first seismic source.

2. The method of claim 1, wherein a direction of the second survey data is generally perpendicular to a direction between the survey sensor device and the first seismic source.

3. The method of claim 1, wherein the subtracting comprises adaptively subtracting the component based on the rotated second survey data from the first survey data.

4. The method of claim 1, wherein the activating of the plurality of seismic sources occurs with a time interval that results in interference among the plurality of seismic sources.

5. The method of claim 1, wherein rotating the second survey data towards the first azimuth comprises rotating gradient data towards the first azimuth, the gradient data including a spatial gradient of the first survey data.

6. The method of claim 5, wherein the gradient data includes first gradient data with respect to a second axis orthogonal to the first axis.

7. The method of claim 6, wherein the gradient data further includes second gradient data with respect to a third axis orthogonal to both the first axis and the second axis.

8. The method of claim 1, wherein the second survey data is measured along a second axis orthogonal to the first axis.

9. The method of claim 8, wherein the first axis is a vertical axis, and the second axis is a horizontal axis.

10. The method of claim 1, further comprising:
rotating, by the system including the processor, the second survey data towards a second azimuth of a second of the plurality of survey sources; and using, by the system including the processor, the rotated second survey data that is rotated towards the second azimuth as a model of interference from a subset of the plurality of seismic sources excluding the second seismic source.

11. The method of claim 1, wherein receiving the first survey data measured by the seismic sensor comprises receiving the first survey data measured by the seismic sensor provided on a land surface or a seabed.

12. A system comprising:
at least one processor configured to:
receive first survey data along a first axis measured by a seismic sensor, the first survey data including contributions from activations of a plurality of seismic sources located at respective different azimuths with respect to the seismic sensor;

receive second survey data comprising one or more of gradient data measured by the seismic sensor, gradient data computed based on measurement data from the seismic sensor, or horizontal translational data;

rotate the second survey data towards a first azimuth of a first of the plurality of seismic sources; and subtract a component based on the rotated second survey data from the first survey data, to separate survey data for the first seismic source.

13. The system of claim 12, wherein the at least one processor is further configured to:
rotate the second survey data towards a second azimuth of a second of the plurality of seismic sources; and subtract a component based on the rotated second survey data rotated towards the second azimuth from the first survey data, to separate survey data for the second seismic source.

* * * * *